I. TROLLEY.
TONGUE TRUCK.
APPLICATION FILED JULY 22, 1916.

1,305,843.

Patented June 3, 1919.
3 SHEETS—SHEET 1.

INVENTOR.
Isaac Trolley
BY
Rogers, Kennedy & Campbell
ATTORNEYS.

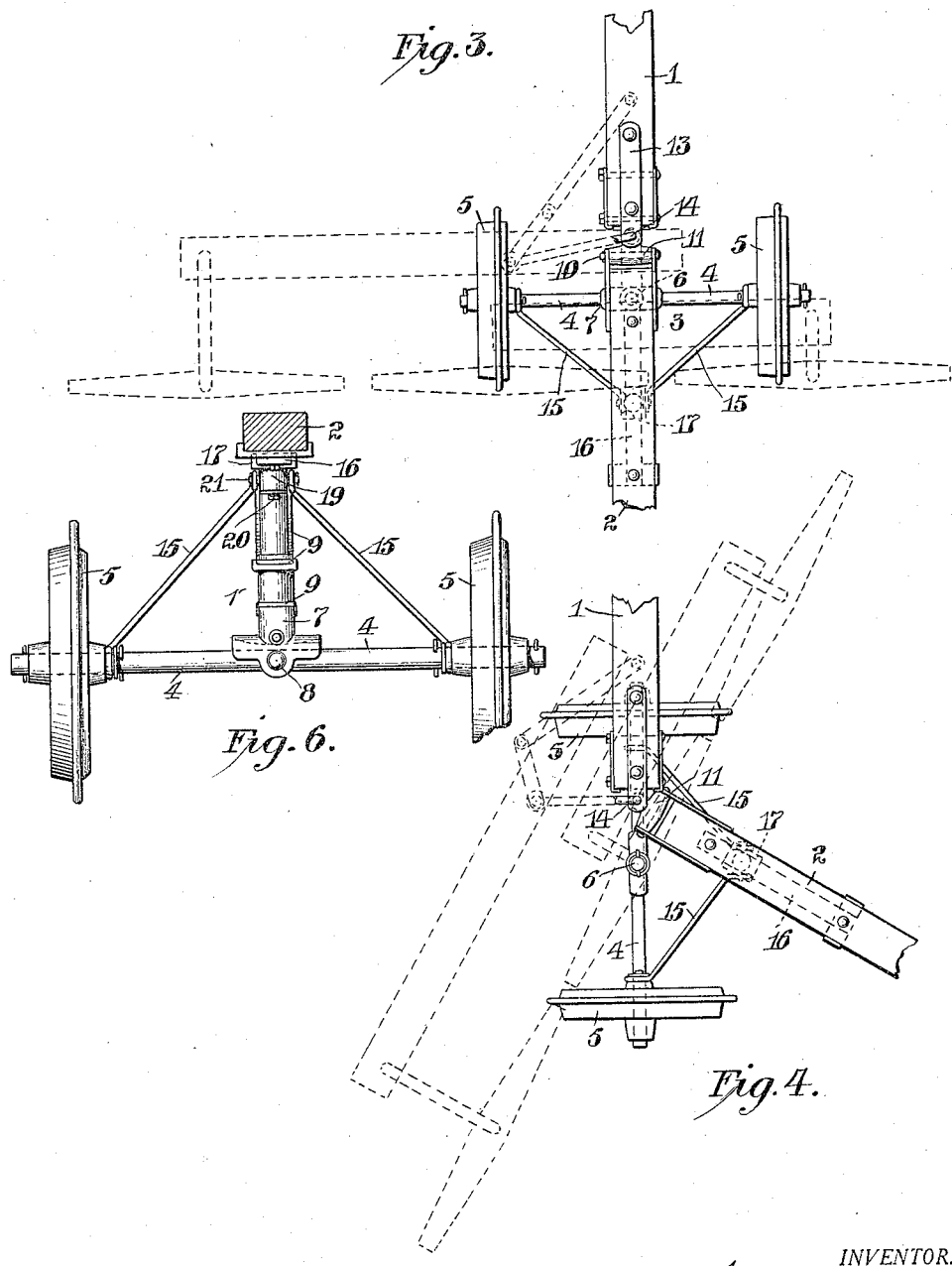

I. TROLLEY.
TONGUE TRUCK.
APPLICATION FILED JULY 22, 1916.
1,305,843.
Patented June 3, 1919.
3 SHEETS—SHEET 3.
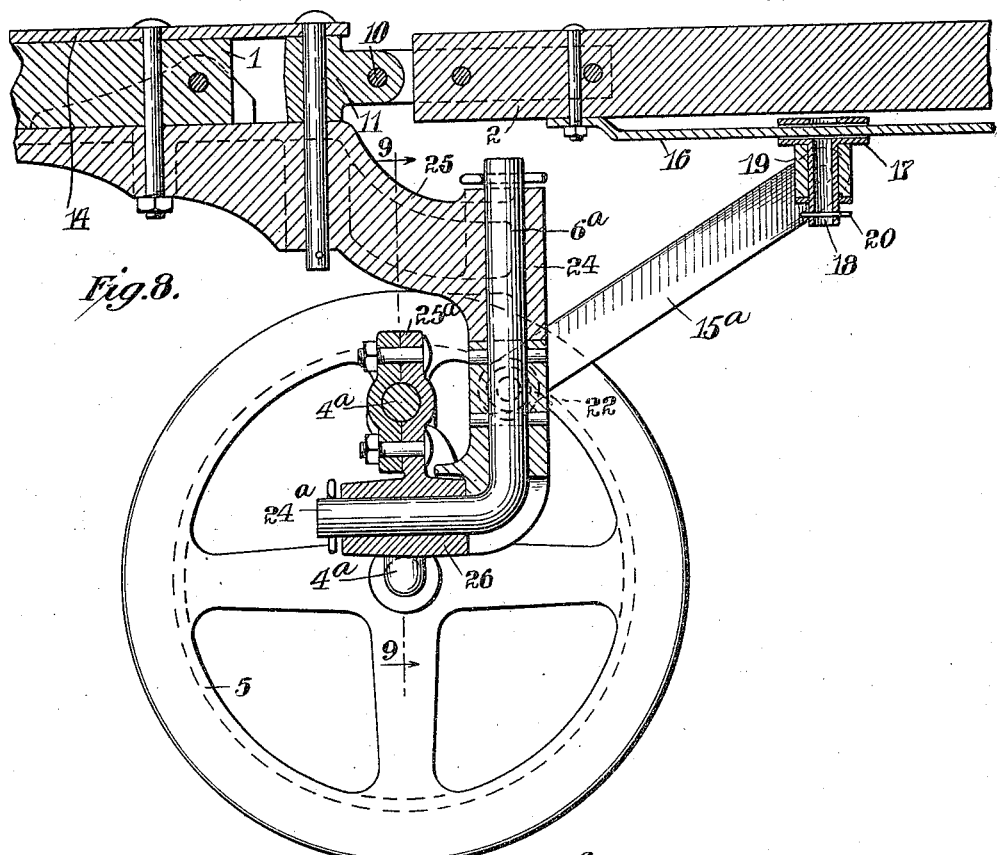
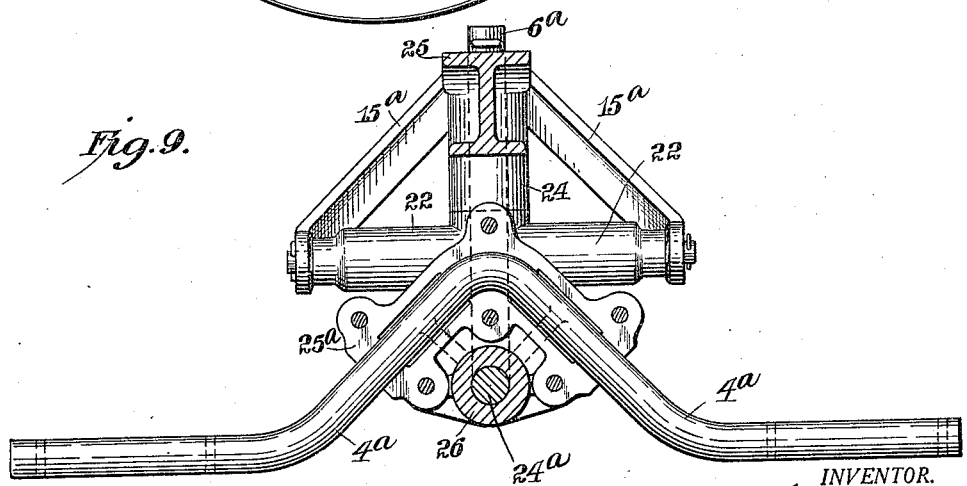
INVENTOR.
Isaac Trolley
BY
Rogers, Kennedy & Campbell
ATTORNEYS.

UNITED STATES PATENT OFFICE.

ISAAC TROLLEY, OF POUGHKEEPSIE, NEW YORK, ASSIGNOR TO MOLINE PLOW COMPANY, A CORPORATION OF ILLINOIS.

TONGUE-TRUCK.

1,305,843.   Specification of Letters Patent.   Patented June 3, 1919.

Application filed July 22, 1916. Serial No. 110,696.

*To all whom it may concern:*

Be it known that I, ISAAC TROLLEY, a citizen of the United States, residing at Poughkeepsie, in the county of Dutchess and State of New York, have invented certain new and useful Improvements in Tongue-Trucks, of which the following is a specification, reference being had therein to the accompanying drawing.

This invention relates to tongue trucks such as are employed in various types of agricultural implements such as harvesting machines, plows, cultivators, harrows and the like, the object of the invention being to provide a mechanism wherein the truck when turned by the guide tongue in guiding the machine, will have a differential movement relative to the tongue, and will in turning, swing around faster than the tongue, to the end that the machine may be turned promptly and squarely at the corners of the field. With this end in view my invention consists in combining with the frame of the machine or frame member, such for instance as the stub tongue of a harvester, a guide tongue pivoted thereto to swing about an upright axis, a tongue supporting truck also pivoted to the frame member to swing about an upright axis, and a coupling or connection of improved form between the guide tongue and tongue truck adapted when the guide tongue is swung about by the draft animals, to impart to the tongue truck a turning motion but at a greater speed than the speed of the guide tongue, whereby the machine will be turned quickly and squarely at the corners of the field and will not be compelled to follow the long curved path of the draft animals in making the turn.

In the accompanying drawings:

Fig. 3 is a top plan view showing the parts in the position they occupy when the machine is traveling straight forward.

Fig. 4 is a similar view showing the tongue truck swung around at right angles to the line of travel in making the turn and with the guide tongue at a lesser angle.

Fig. 6 is a similar view on the line 6—6 of Fig. 1.

Fig. 8 is a vertical longitudinal section of the forward end of a stub tongue, the connected guide tongue and tongue truck, the latter being in modified form.

Fig. 9 is a transverse sectional elevation through the same on the line 9—9 of Fig. 8.

Figure 1:
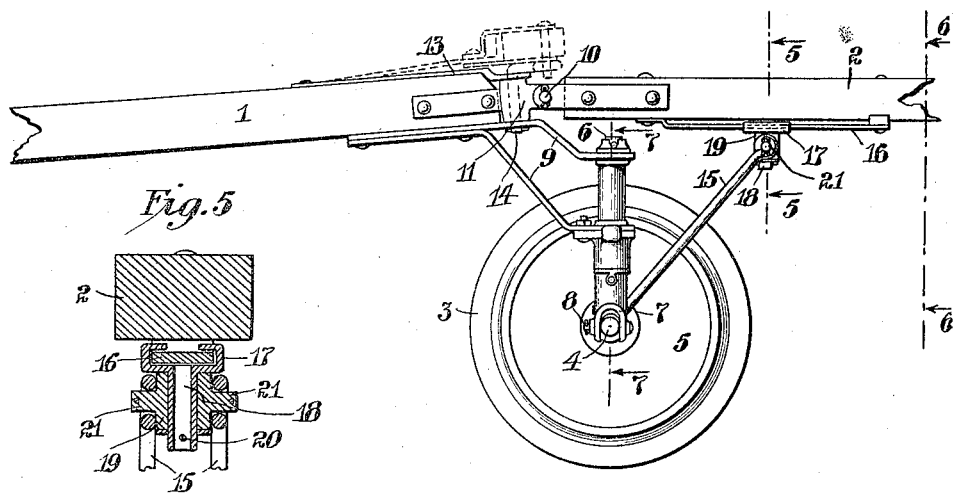
Figure 1 is a side elevation of the forward portion of the stub tongue of an agricultural implement, showing my improved tongue truck applied thereto, with the near wheel omitted.
Figure 5:
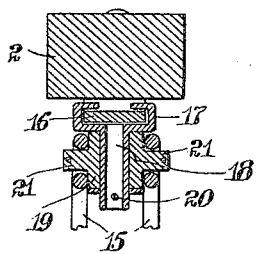
Fig. 5 is a vertical sectional elevation on an enlarged scale on the line 5—5 of Fig. 1.

Referring to the drawings:

Referring to Figs. 1 to 7 inclusive, 1 indicates the forward end of a machine frame member, in the present case the stub tongue of a harvesting machine; 2 indicates a guide tongue connected to and extending forwardly from the stub tongue; and 3 indicates a tongue truck arranged beneath the stub tongue so as to support the same, and operatively connected with the guide tongue so as to be turned in the swinging movements of the tongue in guiding the machine.

Figure 2:
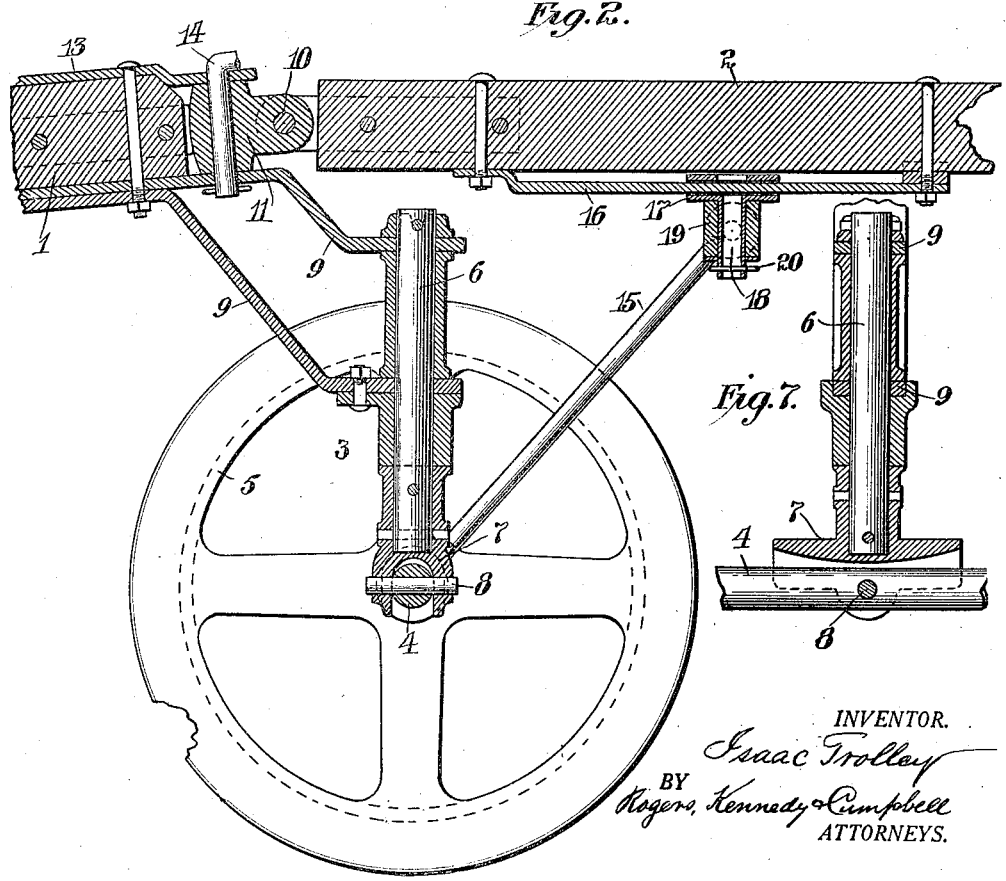
Fig. 2 is a longitudinal sectional elevation of the same on an enlarged scale.
Figure 7:
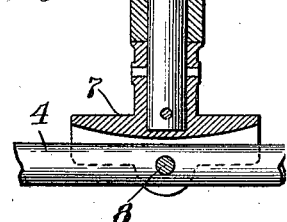
Fig. 7 is a vertical transverse sectional elevation on an enlarged scale on the line 7—7 of Fig. 1.

The truck 3 in the present instance consists of a horizontal axle 4 on the ends of which are mounted truck wheels 5, and an upwardly extending stem 6, the lower end of which is provided with an open socket 7 seated on the axle and pivoted thereto on a horizontal fore and aft axis by means of a pivot pin 8 extending horizontally through the walls of the socket and the axle, as shown more particularly in Fig. 2. The inner side of the socket curves downwardly from opposite ends toward the center as shown in Fig. 7, so as to leave sufficient clearance between the socket and axle to permit the latter to rock to a limited extent about the axis of the pivot pin and relatively to the stem 6, the purpose of this construction being to enable the wheels and axle to adapt themselves to inequalities in the ground without disturbing the upright position of the stem.

The stem 6 is mounted loosely in bearings in the forward ends of two bracket arms 9 projecting forwardly and downwardly from the under side of the stub tongue and firmly fixed thereto, as by means of the fastening bolts shown in Figs. 1 and 2, the arrangement being such that the truck may turn relatively to the stub tongue about an upright or vertical axis coincident with the axis of the stem.

The guide tongue 2 extends at its rear end above the upper end of the stem 6 and rearwardly thereof, the rear extremity of the tongue being pivoted on a horizontal transverse axis as at 10 to a head 11. The head 11 is seated between the upper bracket arm 9 and a bracket plate 13 extending forwardly from the stub tongue over the arm 9, and the head is pivoted between these parts by means of a pivot pin 14 which is extended downwardly through the plate and arm and the head 11 between them. By this means the guide tongue is in effect pivoted to the frame member, that is the stub tongue 1, so that it may swing relatively to the frame member about a horizontal axis, the axis 10, and also about a vertical axis, the axis 14, this latter axis being disposed somewhat in rear of the vertical pivotal axis of the truck for the purpose presently to be described.

Operatively connecting the guide tongue with the truck so that in the lateral swinging motions of the tongue about its vertical axis, the truck will be caused also to turn about its vertical axis, is a coupling member consisting of two links 15, which at their rear ends encircle the axle 4 adjacent the truck wheels respectively, and which extend upwardly and forwardly therefrom and have their forward ends connected with the guide tongue in such manner that they will be capable of a sliding fore and aft motion relatively to the tongue, and a pivotal motion, both about a horizontal and a vertical axis. The connection of the coupling links with the guide tongue is illustrated more particularly in Figs. 2 and 5, where it will be seen that a guiding rail 16 is fixed to the under side of the guide tongue and extends longitudinally thereof, on which rail is mounted a slide 17 provided with a depending journal 18. The journal is loosely encircled by a sleeve 19 confined thereon by a cotter pin 20, which sleeve is provided at diametrically opposite sides with laterally extending studs 21 to which the forward upper ends of the coupling links 15 are connected by means of eyes formed on the ends of the links encircling the studs. This construction admits of a sliding motion of the forward ends of the coupling links longitudinally of the tongue and permits also of a pivotal motion of the links about the horizontal axes of the studs 21, and a further pivotal motion about the vertical axis of the journal 18.

As a result of the foregoing construction it will be understood that when the draft team is traveling straight forward, the truck supporting the forward end of the frame member will follow straight in the line of draft. When now the machine is to be turned at the corner of the field, the guide tongue is swung by the draft animals to the right or left, as the case may be, and turning relatively to the frame member about the vertical axis 14, the truck will be turned about the vertical axis of its stem 6, but owing to the relative locations of the two vertical axes about which the said parts respectively turn, the turning of the truck will be more rapid than that of the guide tongue, and the truck will complete its turn and occupy a position at right angles to the line of travel before the animals have made their complete turn, and the parts will occupy the position shown in Fig. 4, the slide 17 in this action moving rearwardly on its guide, and the forward ends of the coupling links pivoting about the vertical axis of the journal 18 and the horizontal axes of the studs 21.

Due to the operation of the parts in this manner, the machine is turned promptly and squarely at the corners of the field and without danger of collision or interference of the draft animals with the parts of the machine.

The motion of the guide tongue about the horizontal axis 10 and the sliding motion of the forward ends of the coupling links relatively to the tongue permits the tongue to move up and down, as the draft animals travel over the unevenness in the ground, without disturbing the upright position of the stem of the truck, and without causing undue strains to be imposed on the truck, the tongue in effect being capable of a vertical motion independently of the truck.

It will be observed that the coupling member, consisting of the two coupling links, is connected with the truck at opposite sides of and distant from the vertical axis of the truck. This enables the lateral motions of the tongue in guiding, to be transmitted to the truck under the most favorable conditions for insuring prompt and uniform turning action of the same.

In Figs. 8 and 9 I have represented a modified form of my invention. In this case the rear ends of the coupling links 15$^a$ instead of being connected directly to the axle of the truck as in the first instance described, are pivotally connected to the outer ends of horizontal arms 22 projecting from an upright stem 6$^a$ mounted in a vertical bearing 24 in the forward end of a bracket 25 whose rear end is firmly fixed to the under side of the stub tongue. The stem 6$^a$ extends below the arms 22 and at its lower extremity it extends horizontally rearwardly in the form of a horizontal journal 24$^a$. The truck axle 4$^a$ is bent upwardly at its center and has clamped to it at this point a head 25$^a$ provided on its lower side with a horizontal sleeve 26 mounted loosely on the journal 24 so as to rock thereon, whereby the axle may rock in a vertical plane relatively to the stem and permit the wheels to follow irregularities in the surface of the ground without disturbing the vertical position of the stem. The operation of the parts in this embodiment of the invention is substantially the same as the form just described, the axis of the tongue truck being arranged in advance of the axis of the guide tongue and the lateral movements of the latter causing the truck to swing about it axis but at relatively greater speed.

In the foregoing description and accompanying drawings I have shown my invention in the different forms which I prefer to adopt and which I have found in practice to answer to a satisfactory degree the ends to be attained. It will be manifest however that the details may be variously changed and modified without departing from the limits of the invention; and it will be understood that the invention is not limited to any particular form or construction of the parts, except in so far as such limitations are specified in the claims.

Having thus described my invention, what I claim is:

1. In combination with a frame member, a guide tongue pivoted thereto both on a horizontal axis and a vertical axis, a tongue truck also pivoted to the frame on a vertical axis, a slide sustained by the guide tongue and movable longitudinally thereof, and two links pivoted at their forward ends independently of each other to said slide, and operatively connected at their rear ends to the truck at points respectively on opposite sides of its vertical axis.

2. In combination with a frame member, a guide tongue pivoted thereto both on a horizontal and a vertical axis, a tongue truck also pivoted to the frame on a vertical axis situated in advance of the axis of the tongue, said truck including a horizontal axle with truck wheels mounted therein, a longitudinally extending guide on the guide tongue, a head movable longitudinally on said guide and rockable relatively to the same on a vertical axis, and a coupling member comprising two links connected at their rear ends to the axle on opposite sides of the axis of the truck and pivoted at their forward ends to the opposite sides of said head on horizontal alined axes.

In testimony whereof, I have affixed my signature in presence of two witnesses.

ISAAC TROLLEY.

Witnesses:
Wm. J. Merkle,
Mary C. Haley.

Copies of this patent may be obtained for five cents each, by addressing the "Commissioner of Patents, Washington, D. C."